(12) United States Patent
Shih

(10) Patent No.: US 9,874,283 B1
(45) Date of Patent: Jan. 23, 2018

(54) VALVE DEVICE CAPABLE OF FAST SWITCHING AND FINE ADJUSTMENT OF FLOW

(71) Applicant: TRANSWORLD STEEL ENTERPRISE CO., LTD., Taichung (TW)

(72) Inventor: Ren-You Shih, Taichung (TW)

(73) Assignee: TRANSWORLD STEEL ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 15/382,590

(22) Filed: Dec. 16, 2016

(30) Foreign Application Priority Data

Nov. 4, 2016 (TW) .............................. 105135883 A

(51) Int. Cl.
*F16K 5/10* (2006.01)
*F16K 5/04* (2006.01)
*F16K 27/06* (2006.01)

(52) U.S. Cl.
CPC .............. *F16K 5/10* (2013.01); *F16K 5/0407* (2013.01); *F16K 5/0471* (2013.01); *F16K 27/065* (2013.01); *Y10T 137/87137* (2015.04); *Y10T 137/88038* (2015.04)

(58) Field of Classification Search
CPC ........ F16K 5/10; F16K 5/0407; F16K 5/0471; F16K 27/065; F16K 5/0605; F16K 11/20; F16K 11/12; Y10T 137/88022; Y10T 137/8803; Y10T 137/88038; Y10T 137/87137

USPC ....... 137/614.16–614.18, 637.4; 251/315.16, 251/120–121

See application file for complete search history.

(56) References Cited

U.S. PATENT DOCUMENTS

| | | | | |
|---|---|---|---|---|
| 2,209,397 A * | 7/1940 | Gannestad | ................ | F16K 5/10 137/614.17 |
| 2,341,411 A * | 2/1944 | Ojalvo | ...................... | F16K 5/10 137/614.17 |
| 2,997,057 A * | 8/1961 | Toth | ...................... | F16K 5/0471 137/315.2 |
| 3,425,451 A * | 2/1969 | Smith | ...................... | F16K 5/10 137/637.4 |
| 3,526,249 A * | 9/1970 | Baustian | .................... | F16K 5/10 137/614.16 |
| 3,610,286 A * | 10/1971 | McGowen, Jr. | ....... | F16K 5/0605 137/327 |
| 3,860,032 A * | 1/1975 | Rogers | ................. | F16K 5/0605 137/614.17 |
| 4,150,692 A * | 4/1979 | Wolf | ........................ | F16K 3/32 137/614.17 |
| 4,230,154 A * | 10/1980 | Kalbfleish | ................ | F16K 5/10 137/614.17 |

(Continued)

*Primary Examiner* — John Bastianelli
(74) *Attorney, Agent, or Firm* — Ming Chow; Sinorica, LLC

(57) ABSTRACT

A valve device capable of fast switching and fine adjustment of flow includes a valve seat unit. The valve seat unit has a chamber therein. The chamber is provided with a switch unit and a fine adjustment unit. The switch unit is used to open or close the valve device. The fine adjustment unit is used to adjust the flow passing the valve device. The user may individually operate the switch unit to quickly open and close the valve device and to operate the fine adjustment unit to adjust the flow passing the valve device so as to enhance the convenience of use.

7 Claims, 7 Drawing Sheets

(56) References Cited

U.S. PATENT DOCUMENTS

| | | | | |
|---|---|---|---|---|
| 4,662,394 A | * | 5/1987 | Williams | F16K 5/0407 137/614.17 |
| 6,186,169 B1 | * | 2/2001 | McHugh | F16K 5/10 251/315.01 |
| 8,191,577 B2 | * | 6/2012 | Markvart | F16K 5/0605 137/614.17 |
| 2013/0153805 A1 | * | 6/2013 | Stulik | F16K 5/0207 251/315.16 |

* cited by examiner

VALVE DEVICE CAPABLE OF FAST SWITCHING AND FINE ADJUSTMENT OF FLOW

FIELD OF THE INVENTION

The present invention relates to a valve device, and more particularly to a valve device capable of fast switching and fine adjustment of flow.

BACKGROUND OF THE INVENTION

A pipe is often used for conveying fluid, and a valve is provided between the pipes for switching control of the pipeline. In order to achieve the purpose of fast switching, there has been developed a plug valve. The plug valve comprises a valve seat. The valve seat has a passage therein. The passage is provided with a plug. The plug is radially formed with a through hole corresponding to the passage. The plug is further connected with an operation handle. The user can operate the operation handle to rotate the plug relative to the valve seat. When the through hole corresponds to the passage, the fluid will pass through the plug valve. When the through hole and the passage are staggered, the fluid is blocked by the plug and cannot pass through the plug valve.

In addition, in order to achieve the purpose of adjusting the flow of the pipeline, the industry has developed a fine adjustment valve. The fine adjustment valve comprises a valve seat. The valve seat has a passage therein. The passage is radially communicated with a screw hole. A screw rod is threadedly provided in the screw hole. The user can adjust the depth of the screw rod inserted into the passage to change the sectional area of the passage so as to adjust the flow.

However, although the foregoing plug valve can control the passage to be fully opened or closed in a quick manner, the flow is adjusted only by adjusting the relative angle between the through hole and the passage, i.e., changing the overlapping area of the through hole and the passage. Because the relative angle between the through hole and the passage cannot be fixed, it is difficult to fix the flow after each switching. This way cannot accurately adjust the flow of the passage. Although the foregoing fine adjustment valve can accurately adjust the flow of the passage, when it is necessary to control the passage to be fully opened or closed, the user needs to constantly rotate the operation member for the screw rod to leave or block the passage. This operation is very inconvenient. Accordingly, the inventor of the present invention has devoted himself based on his many years of practical experiences to solve these problems.

SUMMARY OF THE INVENTION

The primary object of the present invention is to provide a valve device capable of fast switching and fine adjustment of flow. The user may individually operate a switch unit to quickly open and close the valve device and to operate a fine adjustment unit to adjust the flow passing the valve device so as to enhance the convenience of use.

In order to achieve the aforesaid object, the valve device capable of fast switching and fine adjustment of flow of the present invention comprises a valve seat unit, a switch unit, and a fine adjustment unit. The valve seat unit has a chamber therein. An outer surface of the valve seat unit is formed with an input hole, an output hole, a first axial hole and a second axial hole to communicate with the chamber. Wherein, the first axial hole and the second axial hole are disposed at two opposing sides of the valve seat unit, and the second axial hole and the first axial hole have central axes which are disposed concentrically. The switch unit has a switch member disposed in the chamber. One end of the switch member is provided with a rotary shaft. The rotary shaft is inserted through the first axial hole for driving the switch member to turn relative to the valve seat unit with the center axis of the first axial hole as its axis. Another end of the switch member is formed with a through hole corresponding to the second axial hole. A circumferential side of the switch member is formed with a first opening corresponding to the input hole and a second opening corresponding to the output hole. The first opening, the second opening and the through hole are communicated with one another. The fine adjustment unit is disposed in the second axial hole and movable along the central axis of the second axial hole to selectively penetrate the through hole and block the first opening and the second opening.

When the rotary shaft of the switch unit is turned by the user, the switch member will be turned relative to the valve seat unit to an open position or a closed position. When in the open position, the first opening and the second opening are communicated with the inlet hole and the output hole, respectively. When in the closed position, the first opening and the second opening are offset from the input hole and the output hole, Thus, the user can open and close the valve device fast. In addition, the user may adjust the fine adjustment unit to be moved forward and backward along the through hole so as to change the cross-section area between the first opening and the second opening, thereby achieving fine adjustment of the flow. The valve device of the present invention is capable of fast switching and fine adjustment of flow, improving the convenience of use.

DESCRIPTION OF THE PREFERRED EMBODIMENTS

Embodiments of the present invention will now be described, by way of example only, with reference to the accompanying drawings.

Figure 1:
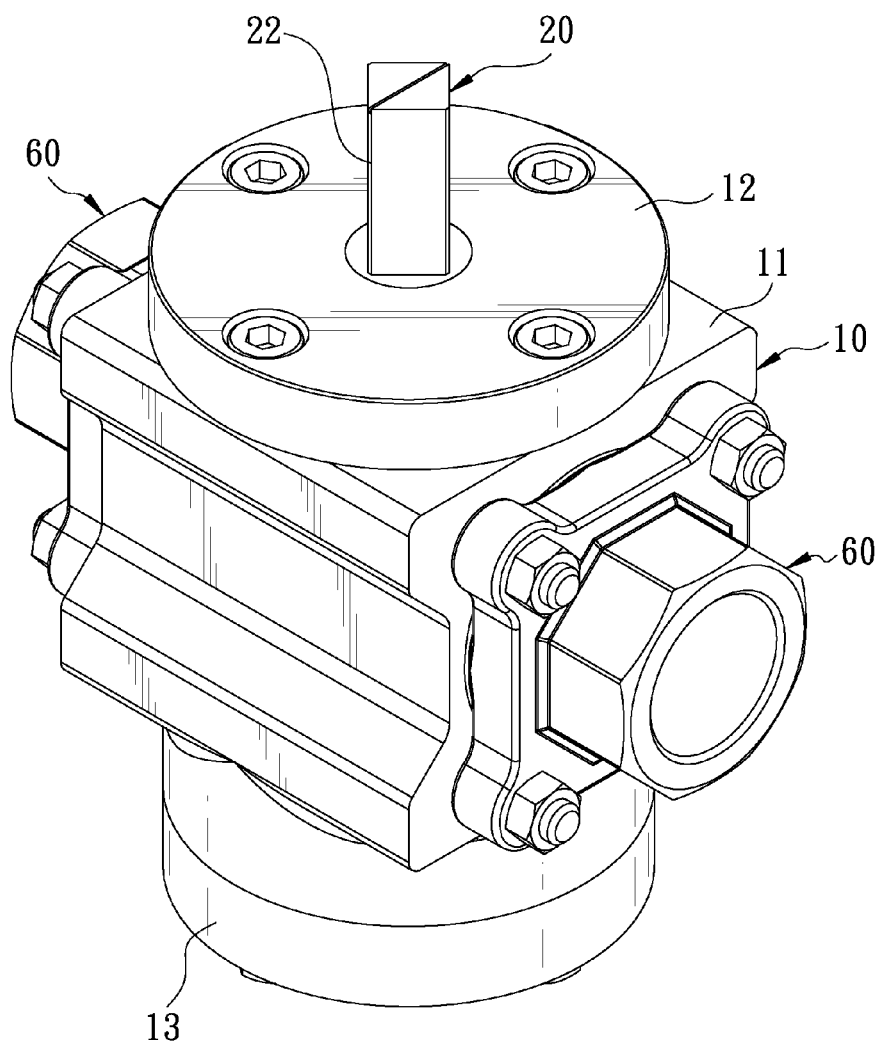
FIG. 1 is a perspective view in accordance with a preferred embodiment of the present invention.
Figure 2:
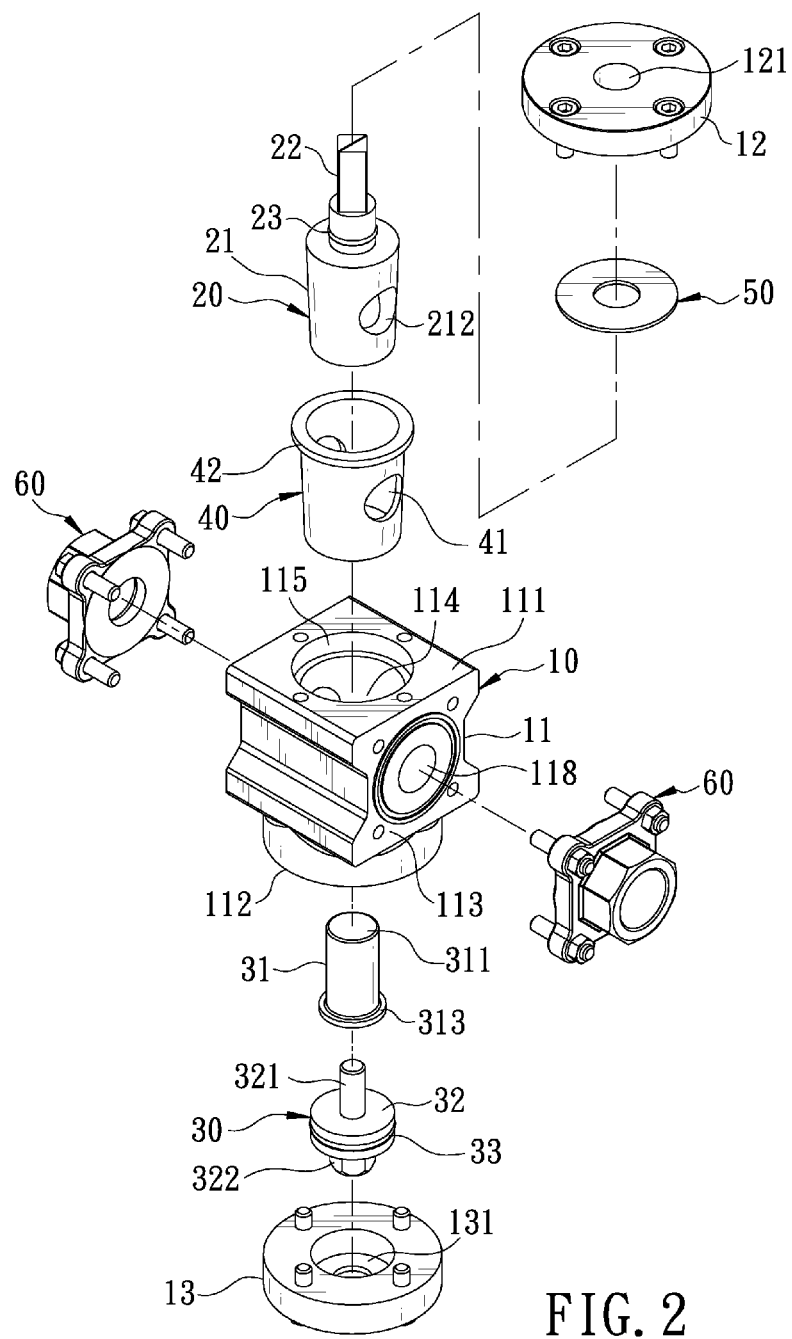
FIG. 2 is an exploded view in accordance with the preferred embodiment of the present invention.
Figure 3:
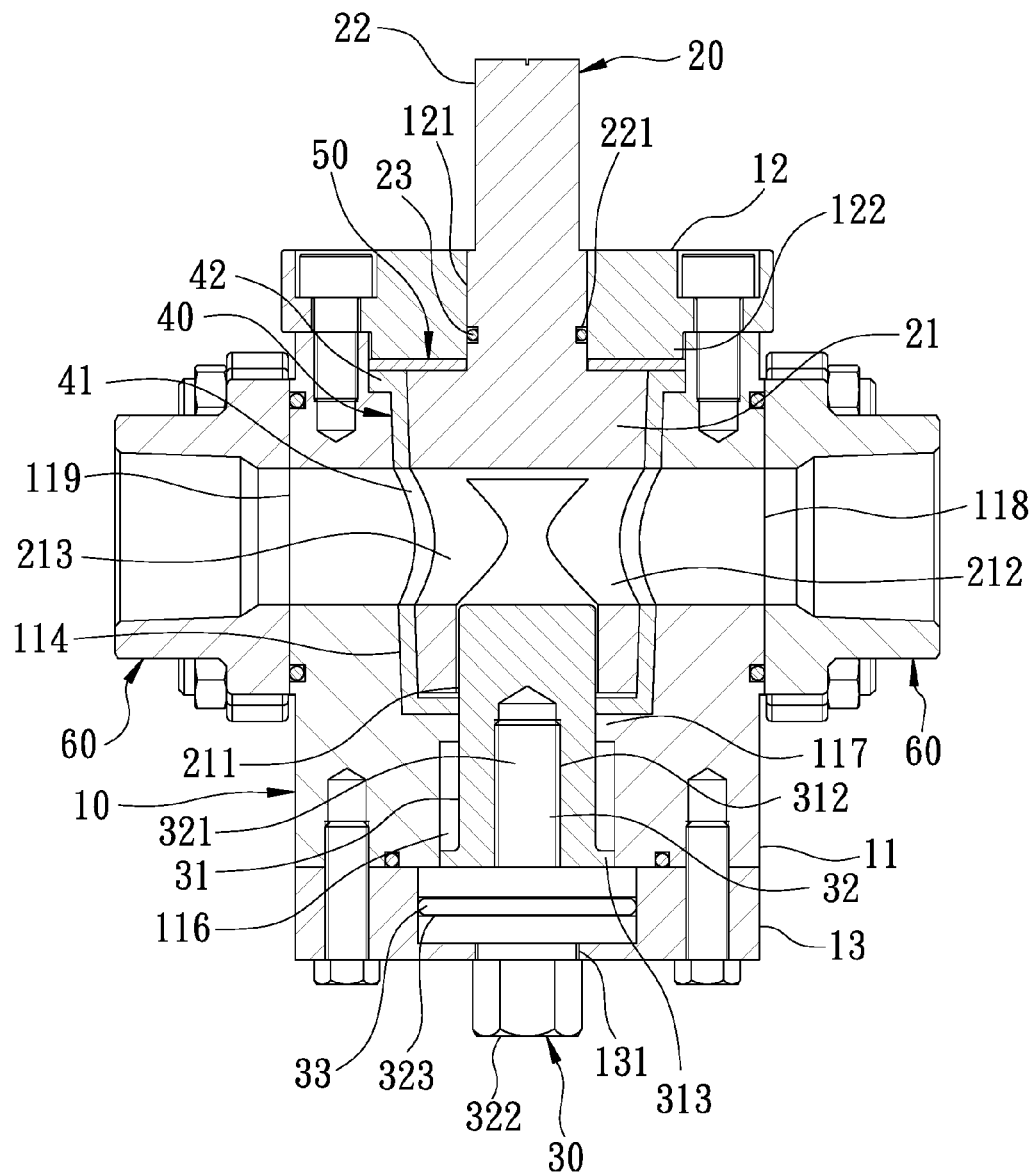
FIG. 3 is a sectional view in accordance with the preferred embodiment of the present invention.

FIG. 1 is a perspective view in accordance with a preferred embodiment of the present invention. FIG. 2 is an exploded view in accordance with the preferred embodiment of the present invention. FIG. 3 is a sectional view in accordance with the preferred embodiment of the present invention. The present invention discloses a valve device capable of fast switching and fine adjustment of flow. The valve device comprises a valve seat unit 10, a switch unit 20, and a fine adjustment unit 30.

The valve seat unit 10 has a seat 11. The seat 11 has an upper surface 11, an opposing lower surface 12, and a circumferential side surface 113 connected between the upper surface 111 and the lower surface 112. The upper surface 111 of the seat 11 is recessed with a chamber 114. An opening of the chamber 114 is further enlarged with a pressing groove 115. The seat 11 is provided with a first cover 12 outside the chamber 114. The first cover 12 has a first axial hole 121 and a pressing block 122 corresponding to the pressing groove 115. The pressing block 122 is engaged with the pressing groove 115. The lower surface 111 of the seat 11 is formed with a second axial hole 116. The second axial hole 116 and the first axial hole 121 have central axes which are disposed concentrically. The seat 11 is provided with a first stopping flange 117 on an inner wall of the second axial hole 116. The lower surface 112 of the seat 11 is provided with a second cover 13. The second cover 13 has a pivot hole 131 corresponding to the second axial hole 116. The circumferential side surface 113 of the seat 11 is further formed with an input hole 118 and an opposing output hole 119.

The switch unit 20 has a switch member 21 disposed in the chamber 114. One end of the switch member 21 is provided with a rotary shaft 22. The rotary shaft 22 is inserted through the first axial hole 121 for driving the switch member 21 to turn relative to the seat 11 with the center axis of the first axial hole 121 as its axis. Another end of the switch member 21 is formed with a through hole 211 corresponding to the second axial hole 116. A circumferential side of the switch member 21 is formed with a first opening 212 corresponding to the input hole 118 and a second opening 213 corresponding to the output hole 119. The first opening 212, the second opening 213, and the through hole 211 are communicated with one another. An outer side surface of the rotary shaft 22 is formed with an annular groove 221. The annular groove 221 is provided with a sealing ring 23 therein.

The fine adjustment unit 30 is disposed in the second axial hole 116 and movable along the central axis of the second axial hole 116 to selectively penetrate the through hole 211 and block the first opening 212 and the second opening 213. In this embodiment, the fine adjustment unit 30 has a slide member 31 slidably disposed in the second axial hole 116. One end of the slide member 31 is a free end 311. Another end of the slide member 31 is formed with a screw hole 312. An outer side of the slide member 31 is provided with a second stopping flange 313 corresponding to the first stopping flange 117. Furthermore, the fine adjustment unit 30 further has a rotary member 32. The rotary member 32 is disposed in the pivot hole 131 and rotatable relative to the second cover 13 with the center axis of the pivot hole 131 as its axis. One side of the rotary member 32 is provided with a screw rod 321. The screw rod 321 is screwed to the screw hole 312 of the slide member 31. Another side of the rotary member 32 is provided with an operation portion 322 extending out of the pivot hole 131. An outer side surface of the rotary member 32 is formed with an annular groove 323. The annular groove 323 is provided with a sealing ring 33 therein.

The valve device of the present invention further comprises a leak-proof bushing 40 which is made of an elastic material such as rubber or plastics. The leak-proof bushing 40 is disposed between the inner wall of the chamber 114 and the outer surface of the switch member 21. The leak-proof bushing 40 has openings 41 respectively corresponding to the first axial hole 121, the second axial hole 116, the input hole 118, and the output hole 119. An outer peripheral side of the leak-proof bushing 40 is provided with a pressing portion 42 corresponding to the pressing groove 115. The pressing portion 42 is located between the pressing groove 115 and the pressing block 122.

The valve device of the present invention further comprises a leak-proof spacer 50. The leak-proof spacer 50 is located between the pressing portion 42 and the pressing block 122.

The valve device of the present invention further comprises two connecting side covers 60. The two connecting side covers 60 are connected to the valve seat unit 10 corresponding in position to the input hole 118 and the output hole 119, respectively.

Figure 4:
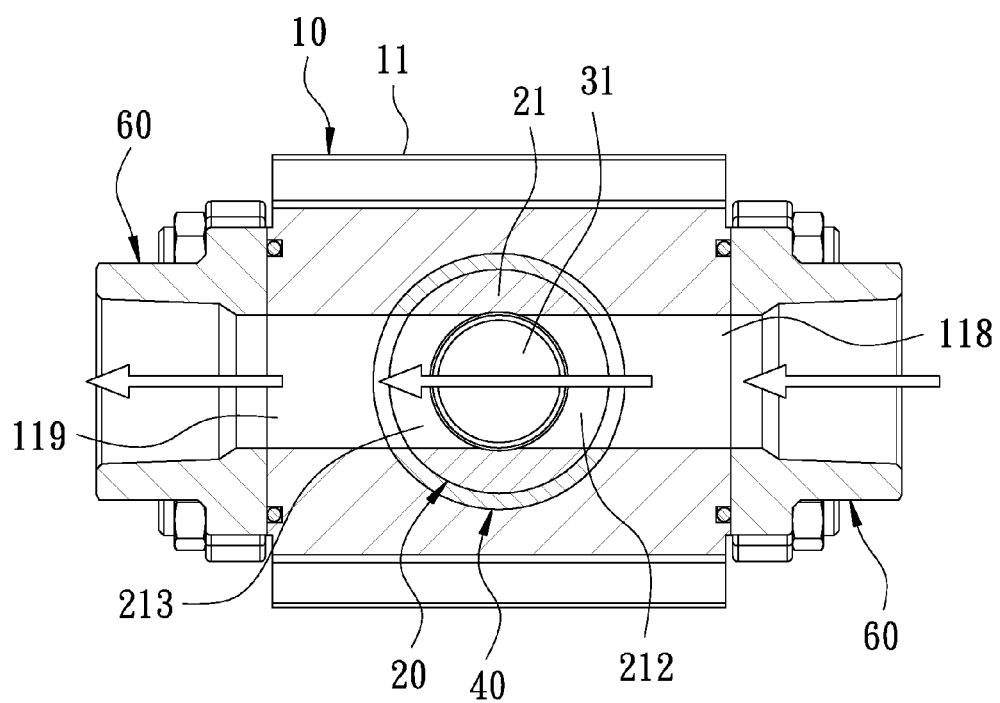
FIG. 4 is a schematic view in accordance with the preferred embodiment of the present invention when in use; showing the switch unit in an open state.
Figure 5:
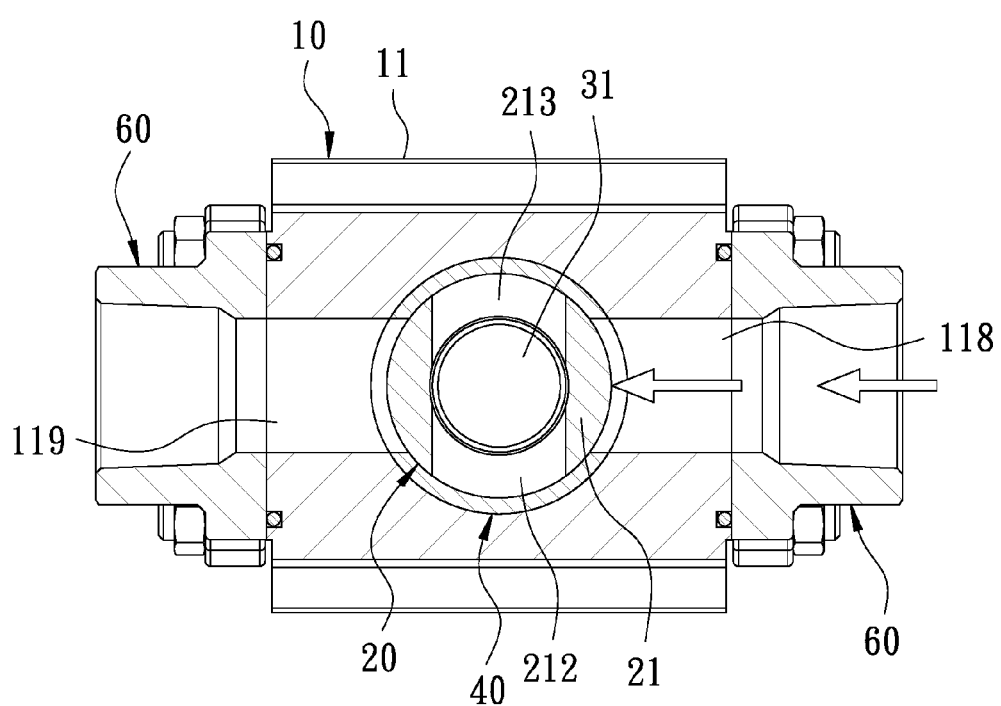
FIG. 5 is a schematic view in accordance with the preferred embodiment of the present invention when in use; showing the switch unit in a closed state.

FIG. 4 and FIG. 5 are schematic views in accordance with the preferred embodiment of the present invention when in use. When the rotary shaft 22 of the switch unit 20 is turned by the user, the switch member 21 is turned relative to the seat 11 to an open position as shown in FIG. 4 or a closed position as shown in FIG. 5. When in the open position, the first opening 212 and second opening 213 are located at the corresponding inlet hole 118 and the output hole 119, respectively, so that external fluid can flow into the chamber 114 from the inlet hole 118, through the first opening 212 and the second opening 213, and out of the chamber 114 via the output hole 119. When in the closed position, the first opening 212 and the second opening 213 are offset from the input hole 118 and the output hole 119, permitting the external fluid to be stopped by the switch member 21 so as not to pass through the chamber 114. Thereby, the user only rotates the rotary shaft 22 a small angle to control the valve device to be opened or closed quickly.

Figure 6:
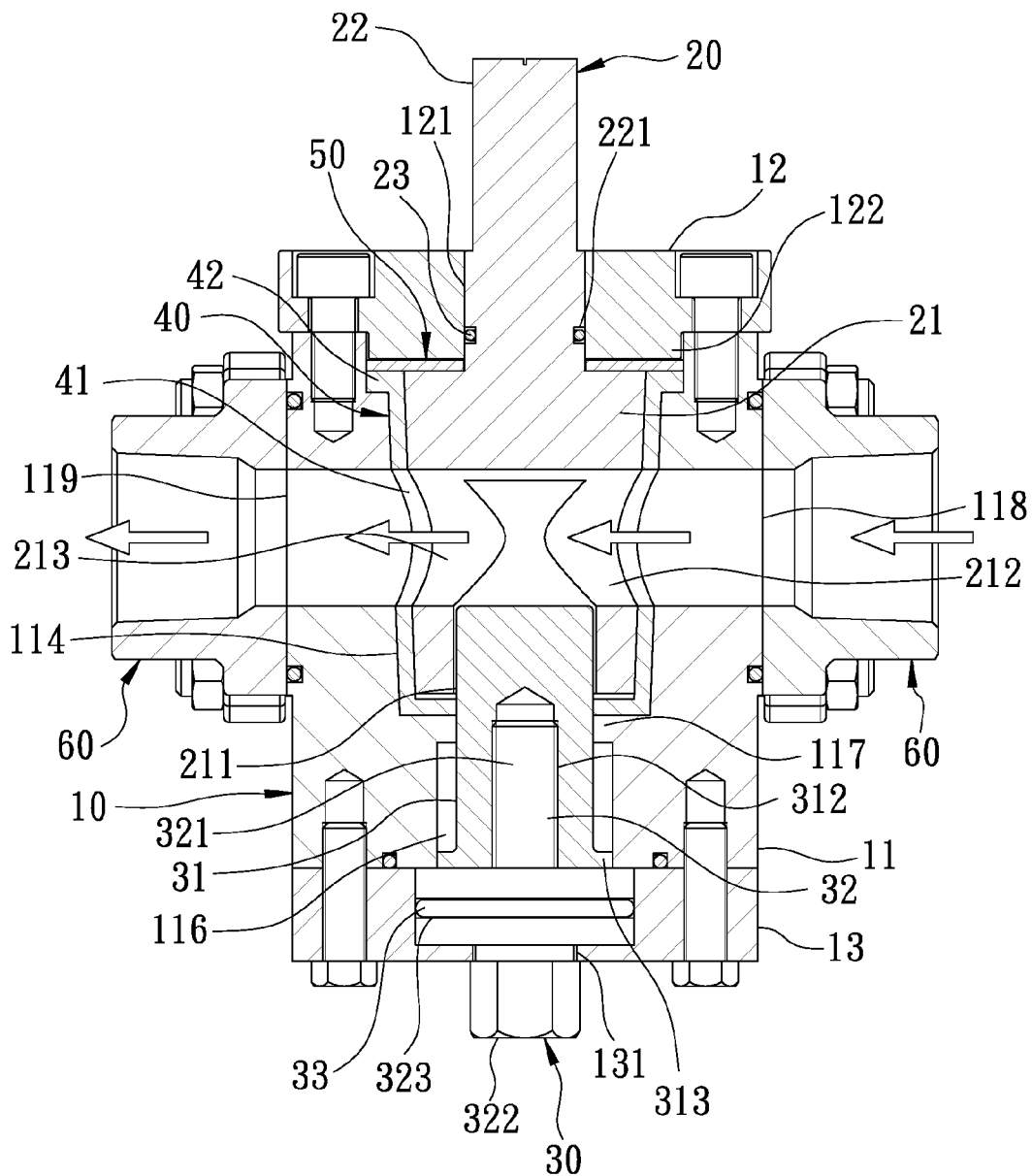
FIG. 6 is a schematic view in accordance with the preferred embodiment of the present invention when in use; showing the fine adjustment unit before fine adjustment.
Figure 7:
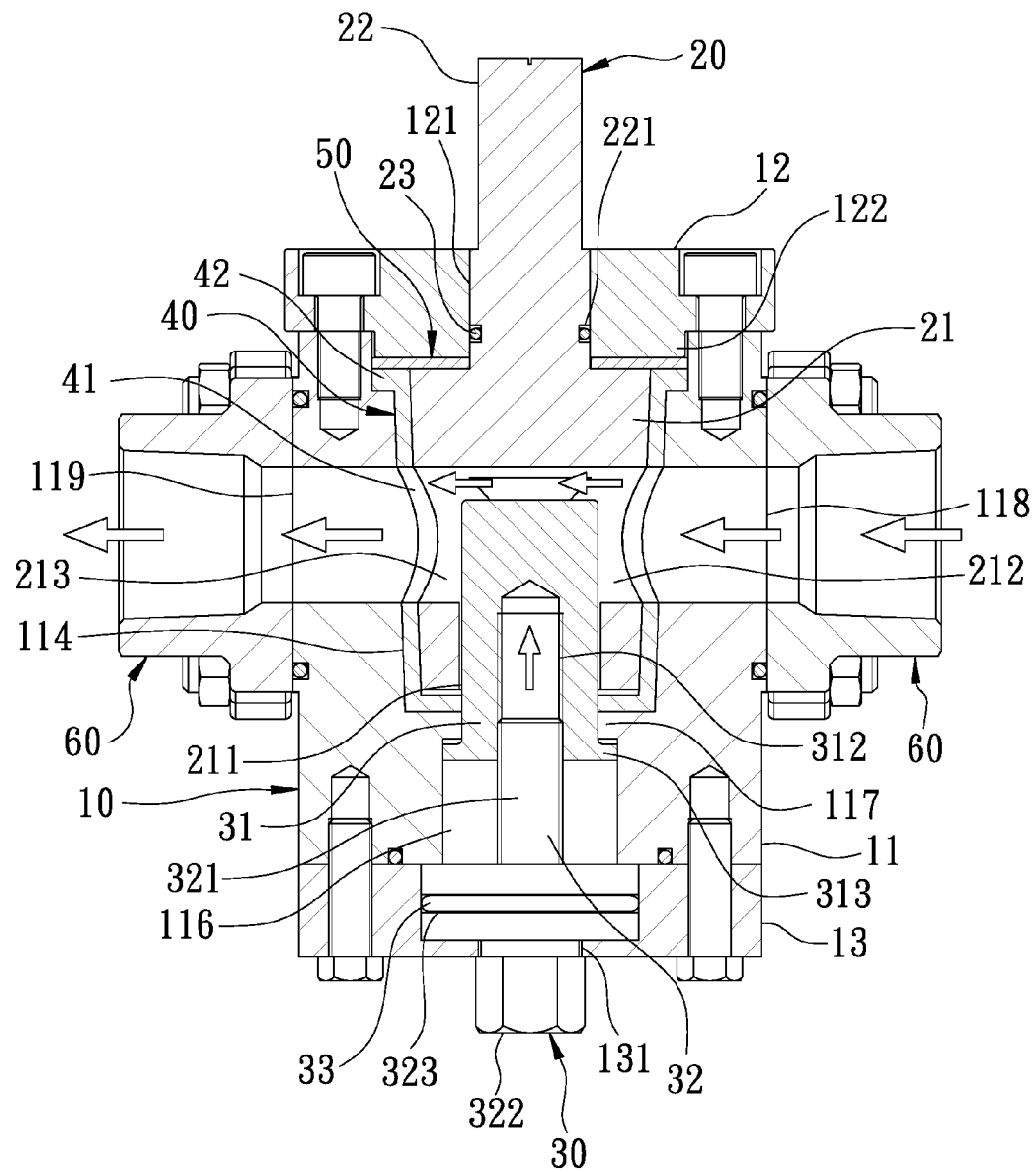
FIG. 7 is a schematic view in accordance with the preferred embodiment of the present invention when in use; showing the fine adjustment unit after fine adjustment.

FIG. 6 and FIG. 7 are schematic views in accordance with the preferred embodiment of the present invention when in use. The user may rotate the rotary member 32 of the fine adjustment unit 30, such that the rotary member 32 is rotated in the pivot hole 131. Because the screw rod 321 of the rotary member 32 is screwed to the screw hole 312 of the slide member 31 and the slide member 31 is slidably disposed in the second axial hole 116, the slide member 31 is slidably moved forward and backward along the central axis of the second axial hole 116 by the screw rod 321 to adjust the depth of the slide member 31 inserted into the through hole 211 so as to change the cross-section area between the first opening 212 and the second opening 213, thereby achieving fine adjustment of the flow.

Thereby, the user may individually operate the switch unit 20 to quickly open and close the valve device and to operate the fine adjustment unit 30 to adjust the flow passing the valve device, so that the present invention can realize a single valve device having the functions of fast switching and fine adjustment of the flow to improve the convenience of use. For example, the user can first adjust the flow passing the valve device by means of the fine adjustment unit 30, and then quickly switch the valve device on or off by means of the switch unit 20. The flow can be fixed after each switching.

It should be noted that since the central axes of the first axial hole 121 and the second axial hole 116 are located on the same axis, the rotation of the switch member 21 and the sliding movement of the slide member 31 will not interfere with each other, and the size of the seat 11 can be significantly reduced.

It is noted that the leak-proof bushing 40 is provided between the inner wall of the chamber 114 and the outer surface of the switch member 21, and the pressing portion 42 of the leak-proof bushing 40 is located in the pressing groove 115, and the top of the pressing portion 42 is further provided with the leak-proof spacer 50. Finally, the pressing block 122 of the first cover 12 is pressed against the leak-proof spacer 50. The valve device can provide a better leak-proof design.

In addition, the connecting side covers 60 of the present invention are replaceable, such that the user can replace the corresponding connecting side covers 60 as desired.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A valve device capable of fast switching and fine adjustment of flow, comprising:
    a valve seat unit, having a chamber therein, an outer surface of the valve seat unit being formed with an input hole, an output hole, a first axial hole and a second axial hole to communicate with the chamber, wherein the first axial hole and the second axial hole are disposed at two opposing sides of the valve seat unit, and the second axial hole and the first axial hole have central axes which are disposed concentrically;
    a switch unit, having a switch member disposed in the chamber, one end of the switch member being provided with a rotary shaft, the rotary shaft being inserted through the first axial hole for driving the switch member to turn relative to the valve seat unit with the center axis of the first axial hole as its axis, another end of the switch member being formed with a through hole corresponding to the second axial hole, a circumferential side of the switch member being formed with a first opening corresponding to the input hole and a second opening corresponding to the output hole, the first opening, the second opening and the through hole being communicated with one another;
    a fine adjustment unit, disposed in the second axial hole and movable along the central axis of the second axial hole to selectively penetrate the through hole and block the first opening and the second opening;
    wherein the valve seat unit has a seat, the seat has an upper surface, an opposing lower surface, and a circumferential side surface connected between the upper surface and the lower surface, the upper surface of the seat is recessed with the chamber, the seat is provided with a first cover outside the chamber, the first cover has the first axial hole, the lower surface of the seat has the second axial hole, and the circumferential side surface of the seat is formed with the input hole and the output hole opposite to the input hole;
    a leak-proof bushing, the leak-proof bushing being disposed between an inner wall of the chamber and an outer surface of the switch member, the leak-proof bushing having openings respectively corresponding to the first axial hole, the second axial hole, the input hole, and the output hole; and
    wherein an opening of the chamber is further enlarged with a pressing groove, the first cover has a pressing block corresponding to the pressing groove, the pressing block is engaged with the pressing groove, an outer peripheral side of the leak-proof bushing is provided with a pressing portion corresponding to the pressing groove, and the pressing portion is located between the pressing groove and the pressing block.

2. The valve device capable of fast switching and fine adjustment of flow as claimed in claim 1, further comprising a leak-proof spacer, the leak-proof spacer being located between the pressing portion and the pressing block.

3. The valve device capable of fast switching and fine adjustment of flow as claimed in claim 1, wherein the lower surface of the seat is provided with a second cover, the second cover has a pivot hole corresponding to the second axial hole, the fine adjustment unit has a slide member slidably disposed in the second axial hole, one end of the slide member is a free end, another end of the slide member is formed with a screw hole, the fine adjustment unit further has a rotary member, the rotary member is disposed in the pivot hole and rotatable relative to the second cover with a center axis of the pivot hole as its axis, one side of the rotary member is provided with a screw rod, the screw rod is screwed to the screw hole of the slide member, and another side of the rotary member is formed with an operation portion extending out of the pivot hole.

4. The valve device capable of fast switching and fine adjustment of flow as claimed in claim 3, wherein the seat is provided with a first stopping flange on an inner wall of the second axial hole, and an outer side of the slide member is provided with a second stopping flange corresponding to the first stopping flange.

5. The valve device capable of fast switching and fine adjustment of flow as claimed in claim 3, wherein an outer side surface of the rotary member is formed with an annular groove, and the annular groove is provided with a sealing ring therein.

6. The valve device capable of fast switching and fine adjustment of flow as claimed in claim 1, wherein an outer side surface of the rotary shaft is formed with an annular groove, and the annular groove is provided with a sealing ring therein.

7. The valve device capable of fast switching and fine adjustment of flow as claimed in claim 1, further comprising two connecting side covers connected to the valve seat unit corresponding in position to the input hole and the output hole, respectively.

* * * * *